US012780422B1

(12) United States Patent
Blackburn et al.

(10) Patent No.: US 12,780,422 B1
(45) Date of Patent: Nov. 3, 2026

(54) OVERLOAD PREVENTION LOCKING MECHANISM

(71) Applicant: B/E Aerospace, Inc., Winston-Salem, NC (US)

(72) Inventors: Troy R. Blackburn, Elkin, NC (US); Michael Furlong, Sebastian, FL (US); Mark A. Vanhoy, Hamptonville, NC (US); Zane M. Yates, Clemmons, NC (US); Bobby W. Lawson, Walnut Cove, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 19/423,547

(22) Filed: Dec. 17, 2025

Related U.S. Application Data

(60) Provisional application No. 63/895,801, filed on Oct. 8, 2025.

(51) Int. Cl.
*B64D 11/06* (2006.01)

(52) U.S. Cl.
CPC ........ *B64D 11/0619* (2014.12); *B64D 11/064* (2014.12)

(58) Field of Classification Search
CPC ........... B64D 11/0619; Y10T 292/0969; Y10T 292/097; Y10T 292/0972; Y10T 292/0975; Y10T 292/0995; Y10T 292/1015; Y10T 292/0974; Y10T 292/54; Y10T 292/558; Y10T 292/1021
See application file for complete search history.

(56) References Cited

U.S. PATENT DOCUMENTS

| | | | | | |
|---|---|---|---|---|---|
| 2,673,758 | A * | 3/1954 | Schlage | E05B 63/044 292/1.5 |
| 3,494,650 | A * | 2/1970 | Slopa | E05B 65/0053 292/332 |
| 8,851,530 | B2 * | 10/2014 | Geringer | E05B 47/0012 292/201 |
| 10,107,015 | B2 * | 10/2018 | Geringer | E05B 47/0012 |
| 10,336,455 | B2 | 7/2019 | McIntosh et al. | |
| 12,377,956 | B2 | 8/2025 | Custance | |
| 12,434,821 | B2 | 10/2025 | Becquet | |
| 2011/0138579 | A1 * | 6/2011 | Sato | E05F 5/003 292/164 |
| 2025/0242922 | A1 | 7/2025 | Malecha et al. | |

FOREIGN PATENT DOCUMENTS

| | | | |
|---|---|---|---|
| EP | 3350075 | B1 | 5/2021 |
| EP | 4530489 | A1 | 4/2025 |

* cited by examiner

*Primary Examiner* — Arfan Y. Sinaki
(74) *Attorney, Agent, or Firm* — Suiter Swantz IP

(57) ABSTRACT

A system including an actuator assembly including dynamic components and static components, a base spring pad approximate to a first end of the actuator assembly, and a pin housing located at a second end of the actuator assembly. Responsive to an overload event acting upon the system, a load spring of the base spring pad compresses, resulting in shifting of the dynamic components of the actuator assembly. This shifting results in a spring-loaded pin in the pin assembly dropping to engage with a pin stop, wherein engagement between the spring-loaded pin and the stationary pin stop causes lateral movement of the dynamic components of the actuator assembly to stop moving. This intentional shifting reduces the effects of the overload event upon the stationary components.

17 Claims, 8 Drawing Sheets

OVERLOAD PREVENTION LOCKING MECHANISM

CROSS-REFERENCE TO RELATED APPLICATIONS

The present application claims priority to U.S. Provisional Application Ser. No. 63/895,801, filed Oct. 8, 2025, which is incorporated herein by reference in their entirety.

TECHNICAL FIELD

The present disclosure relates generally to support systems for airplane components, and in particular, to a collapsible support to prevent overload of the components.

BACKGROUND

In air travel, many aircraft components, such as replaceable modules, installable furniture, or other components that are loaded onto an aircraft are required to comply with standards or regulations related to the bearing of a static load. However, the traditional approach to meeting the required static loads is to increase the amount of locking devices or to increase thickness of static supports. However, there are still limits that traditional modules can sustain prior to overload or breaking of support brackets or other structural components.

It is therefore desirable to provide systems for these components and modules that are able to withstand greater forces that are acted upon the mounting frames or brackets for the modules. Additionally, it is desirable to provide systems that are able to withstand such forces that are able to function without intervention by a human operator to perform a reset.

SUMMARY

In some aspects, the techniques described herein relate to a system for preventing an overload of a bracket unit for an aircraft component, the system including: an actuator assembly including dynamic components and static components; a base spring pad approximate to a first end of the actuator assembly, the base spring pad including a load spring; a pin housing located approximate to a second end of the actuator assembly, the pin housing including a spring-loaded pin and a pivot arm coupled at a first position to the pin housing and coupled at a second position to the actuator assembly, wherein responsive to a force applied to the system, the load spring of the base spring pad compresses causing lateral movement of the dynamic components of the actuator assembly toward a direction of the pin housing, wherein lateral movement of the dynamic components of the actuator assembly causes the pivot arm to rotate, dropping the spring-loaded pin towards a stationary pin stop, wherein engagement between the spring-loaded pin and the stationary pin stop causes lateral movement of the dynamic components of the actuator assembly to stop moving.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

DETAILED DESCRIPTION

Figure 1A:
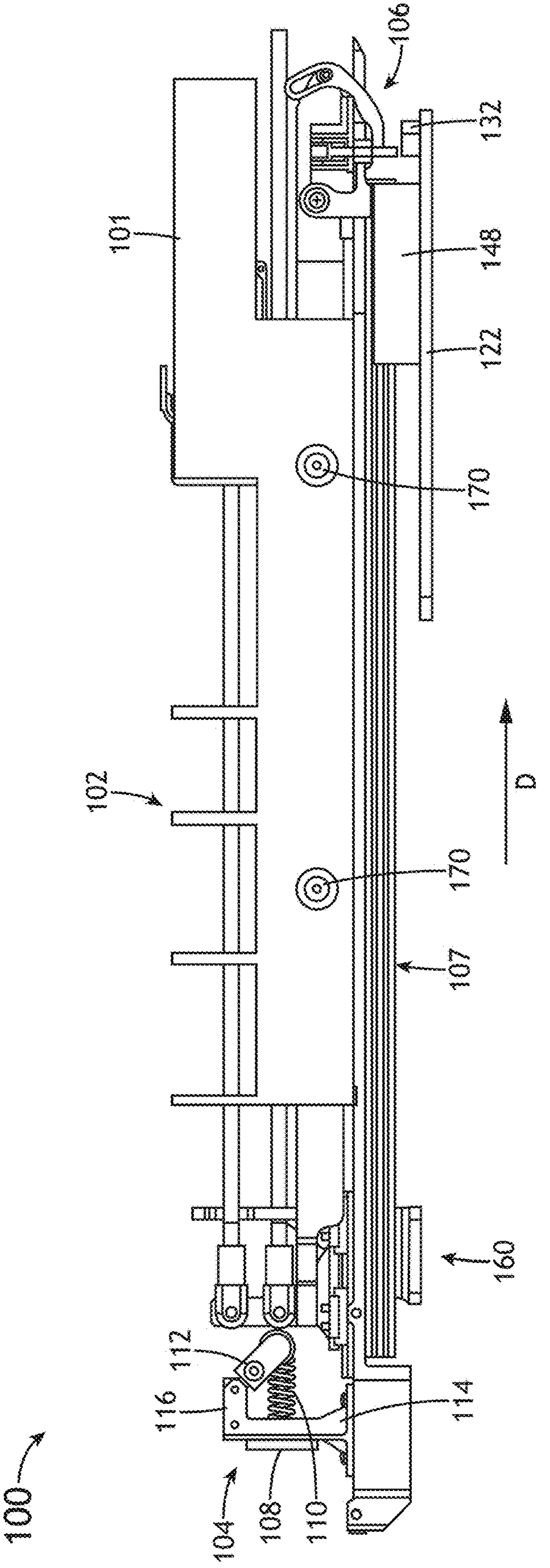
FIG. 1A is a first side perspective view of an overload lock in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to devices and systems for providing a dynamic, collapsible aircraft module bracket configured for partially collapsing or shifting in response to an overload force acting upon the bracket system. As described herein, the system includes a series of connected static and dynamic components that are utilized to prevent overload of components that are not otherwise capable of sustaining loads exceeding a certain threshold. For example, the use of a spring element configured to collapse under a given load may initiate a system wide shift, resulting in the dropping of a spring-loaded pin at a specified location to prevent overload of the system. This intentional movement and dropping of the pin is used to provide a force dispersion effect, through incorporating deliberate movement of the system to prevent overloading the static components. Once the force or load acting upon the system is removed, the system may reset itself without intervention by a human operator.

Turning now to the Figures, embodiments of a collapsible aircraft module locking system, or simply overload lock 100 is depicted through various views. As described herein, the overload lock 100 may be utilized with a variety of different aircraft components or modules, such as furniture (e.g., aircraft seats), cassettes, or other installable aircraft components, referred to and depicted generally as module 101. In embodiments, the overload lock 100 may include a series of static components that remain stable or still during an overload event and a series of dynamic components that are configured to shift or move laterally in response to the overload event, resulting in the collapsing of a spring-loaded pin. This intentional movement and collapse of the overload lock 100 aids in preventing overload of the static components that would otherwise not be capable of sustaining the load, thereby preventing or reducing the chance of breakage of the static components.

Broadly embodiments of the overload lock 100 includes an actuator assembly 102, a base spring pad 104 located approximate to a first end of the actuator assembly 102, and a pin housing 106 located approximate to a second end of the actuator assembly 102 (e.g., on an opposite end of the actuator assembly 102 respective to the base spring pad 104).

Figure 1B:
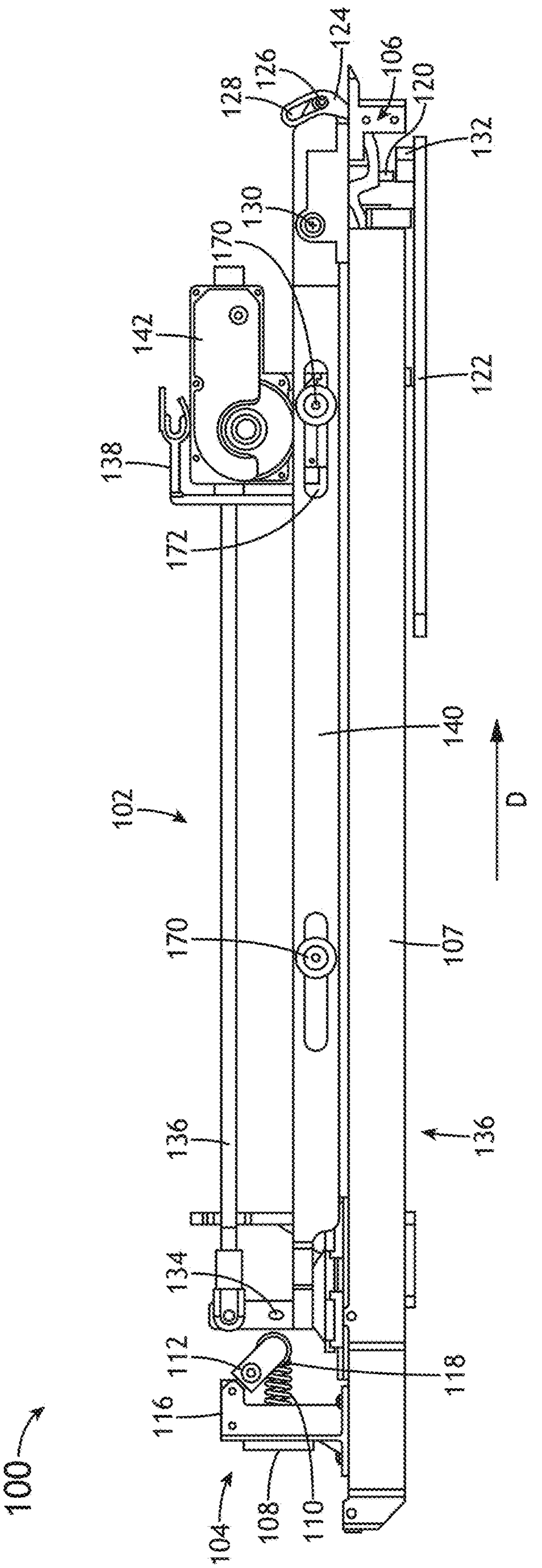
FIG. 1B is a second side perspective view of an overload lock in accordance with one or more embodiments of the present disclosure.

In embodiments, the base spring pad 104 is configured as a collapsible unit, such that during an overload event, the collapsing of the base spring pad 104 drives the lateral movement of the actuator assembly 102 in direction D. In embodiments, and as described below, the base spring pad 104 may also be configured for lateral shifting through coupling to a sliding or shifting bottom rail mount 107. For example, and as depicted in FIGS. 1A-1B, the base spring pad 104 may be mounted at a first end of a bottom rail mount 107. As described below, the base spring pad 104 is configured to compress during a compression event, which allows for a shift in the dynamic components of the overload lock 100 during the overload event.

In embodiments, the base spring pad 104 includes a mounted bracket 108, a load spring 110, and a spring pad linkage arm 112. In embodiments, the mounted bracket 108 may be fixedly coupled to the bottom rail mount 107 through one or more fasteners, including for example, mechanical fasteners such as screws or bolts. In embodiments, the mounted bracket 108 may include a "L" shape, with a first portion 114 extending vertically from the bottom rail mount 107 with a second portion 116 extending horizontally from the top of the first portion 114. However, in further embodiments, such as the embodiments depicted in FIG. 4, the mounted bracket 108 may include different designs, such as an "I" shape.

As further depicted, the spring pad linkage arm 112 may be a linkage or other piece of material that is configured for dynamic movement during an overload event, corresponding to a coupling point between the spring pad linkage arm 112 and the mounted bracket 108, including for example, at a terminal end of the second portion 116. For example, the spring pad linkage arm 112 may be configured for rotational movement in response to an overload event. For example, the spring pad linkage arm 112 may be configured to linearly translate during an overload event, such as through a linear slide mechanism. During normal operation (i.e., absent the overload event), the spring pad linkage arm 112 may be positioned in a first orientation, and during an overload event, the spring pad linkage arm 112 may rotate about the first pivot position. As described below, the position of the spring pad linkage arm 112 may be based on the status of the load spring 110.

In embodiments, the spring pad linkage arm 112 also engages with or is coupled to the load spring 110. For example, one end of the load spring 110 may engage with the spring pad linkage arm 112. For example, the spring pad linkage arm 112 may include an extension member 118 located at a second end of the spring pad linkage arm 112. For example, the extension member 118 may be shaped as a dome or cylindrical design for insertion into the interior dimensions of the load spring 110. In this regard, the load spring 110 may be at least partially retained through engagement with the spring pad linkage arm 112. In embodiment, the extension member 118 may be coupled approximate to a distal end of the spring pad linkage arm 112, with a proximal end corresponding to the first pivot position coupled at the second portion 116 of the mounted bracket 108. However, it should be understood that the load spring 110 may be engaged with the spring pad linkage arm 112 using alternative methods.

In embodiments, the load spring 110 may be a pre-loaded spring element that is incorporated into the base spring pad 104. In embodiments, and as described above, a first end of the load spring 110 may be engaged with the spring pad linkage arm 112, such as through engagement with the extension member 118. Additionally, a second end of the load spring 110 may be engaged with or retained within an interior portion of the mounted bracket 108. For example, the mounted bracket 108 may include a retention member (such as an extension member or groove) that is adapted for retaining the load spring 110 in a fixed position against the mounted bracket 108.

Figure 2A:
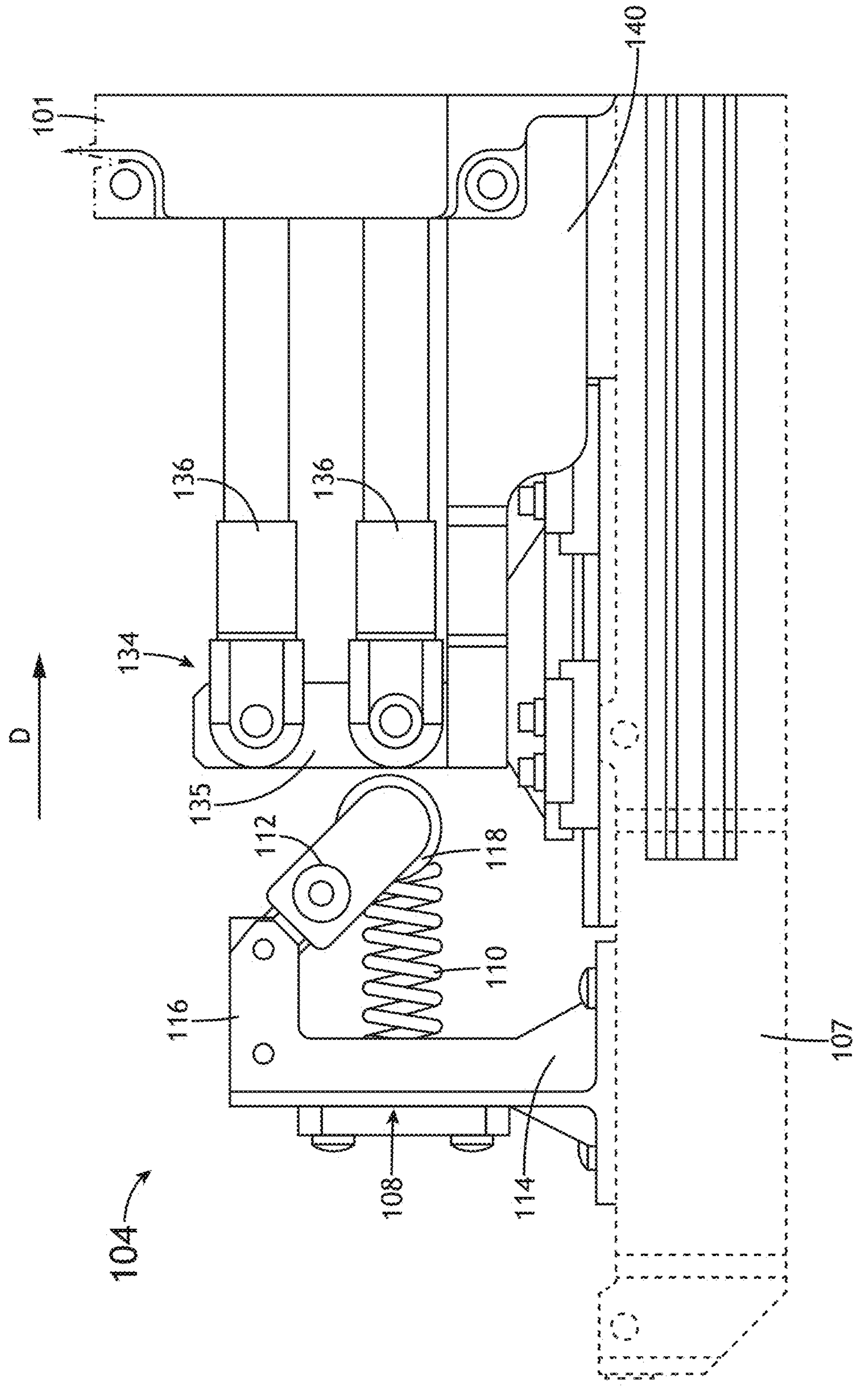
FIG. 2A is a first side perspective view of the base spring pad of the overload lock in accordance with one or more embodiments of the present disclosure.
Figure 2B:
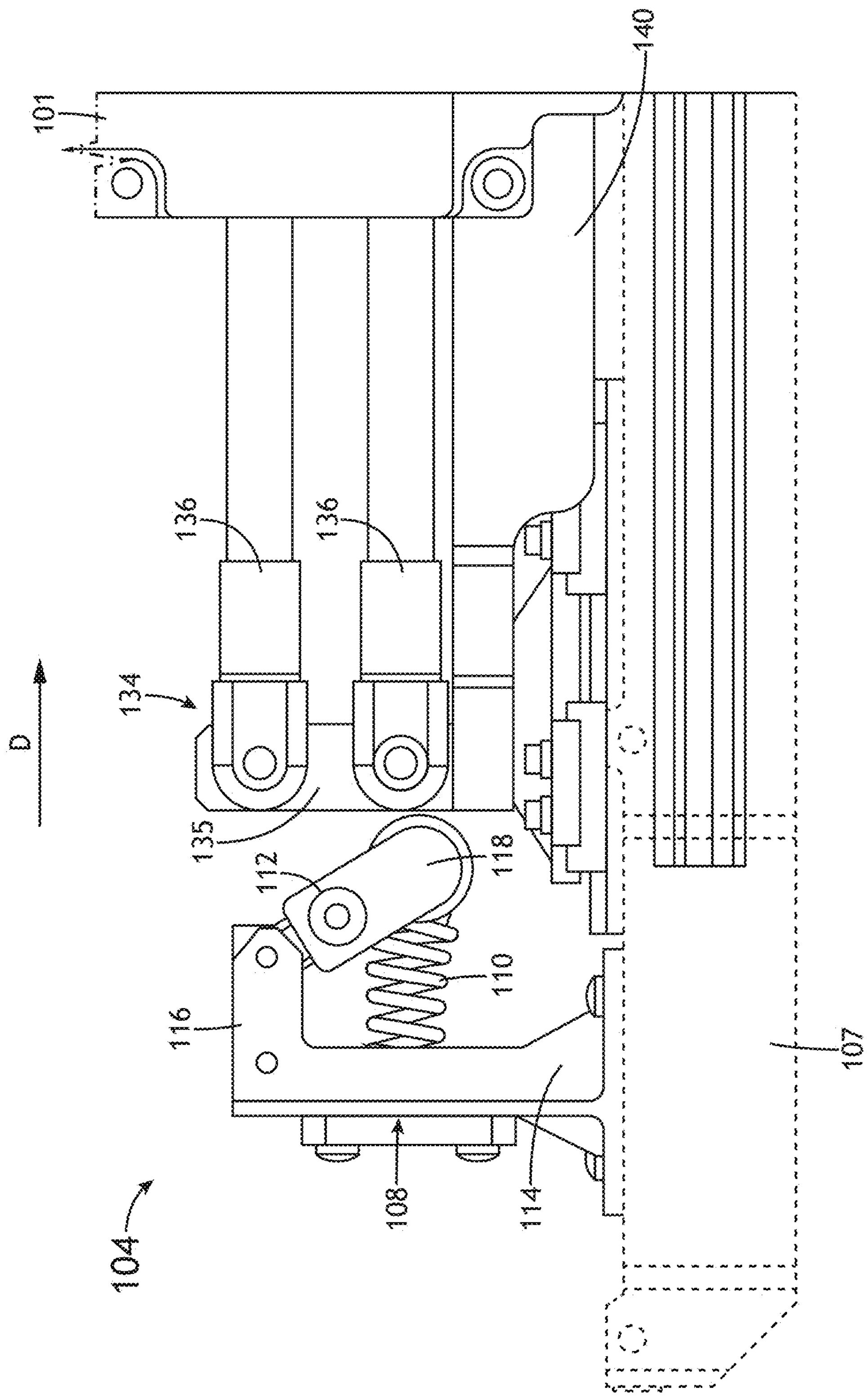
FIG. 2B is a second side perspective view of the base spring pad of the overload lock in accordance with one or more embodiments of the present disclosure.

As depicted in FIG. 2A-2B, and in embodiments, the load spring 110 may be pre-loaded to allow for normal operation under standard operating conditions. For example, the load spring 110 may be adapted or configured as a spring that is under a constant initial compression or tension before any external load is applied (e.g., the overload event). For example, this preload ensures there is no slack in the system and that the spring begins to work immediately when a load is applied. Accordingly, the load spring 110 may be pre-loaded with enough initial compression or tension for use in normal operating conditions, and which may be customized or initially determined. Accordingly, during normal operation, the load spring 110 may be at an extended position and exerting a lateral force against the mounted bracket 108. With this force being applied, the remaining portions of the overload lock 100 may remain static or experience minor or minimal shifting during normal operations. Accordingly, the load spring may be configured to sustain an applied upon force up to a pre-determined amount, such that a force that is less than the pre-determined amount would not cause compression of the load spring 110.

As depicted in FIG. 2A-2B, and in embodiments, responsive to an overload event occurring (e.g., a force or load being exerted upon the overload lock 100), the load spring 110 may be configured to compress towards the mounted bracket 108. For example, FIG. 2A depicts the load spring 110 in an expanded state, indicative of normal operations. For example, FIG. 2B depicts the load spring 110 in a compressed state, indicative of an overload event. As described herein, this compression of the load spring 110 creates a relative motion between the fixed components and the dynamic, moving portions of the overload lock 100, including portions of the dynamic components that shift in relation to one another, e.g., the bottom rail mount 107 and the actuator linkage 140. For example, during the overload event, the dynamic portions of the overload lock 100 may slide in direction D as depicted in the Figures.

In embodiments, when the overload event ends, e.g., the overloading external force is no longer exerting upon the system, the load spring 110 may decompress and extend back to its original position. Accordingly, the extension of the load spring 110 may also be applied to the spring pad linkage arm 112, causing the spring pad linkage arm 112 to move back to its original, operating position. Accordingly, user intervention is not required to either cause the compression of the load spring 110 or to reset the load spring 110 after the overload event ends.

Figure 3A:
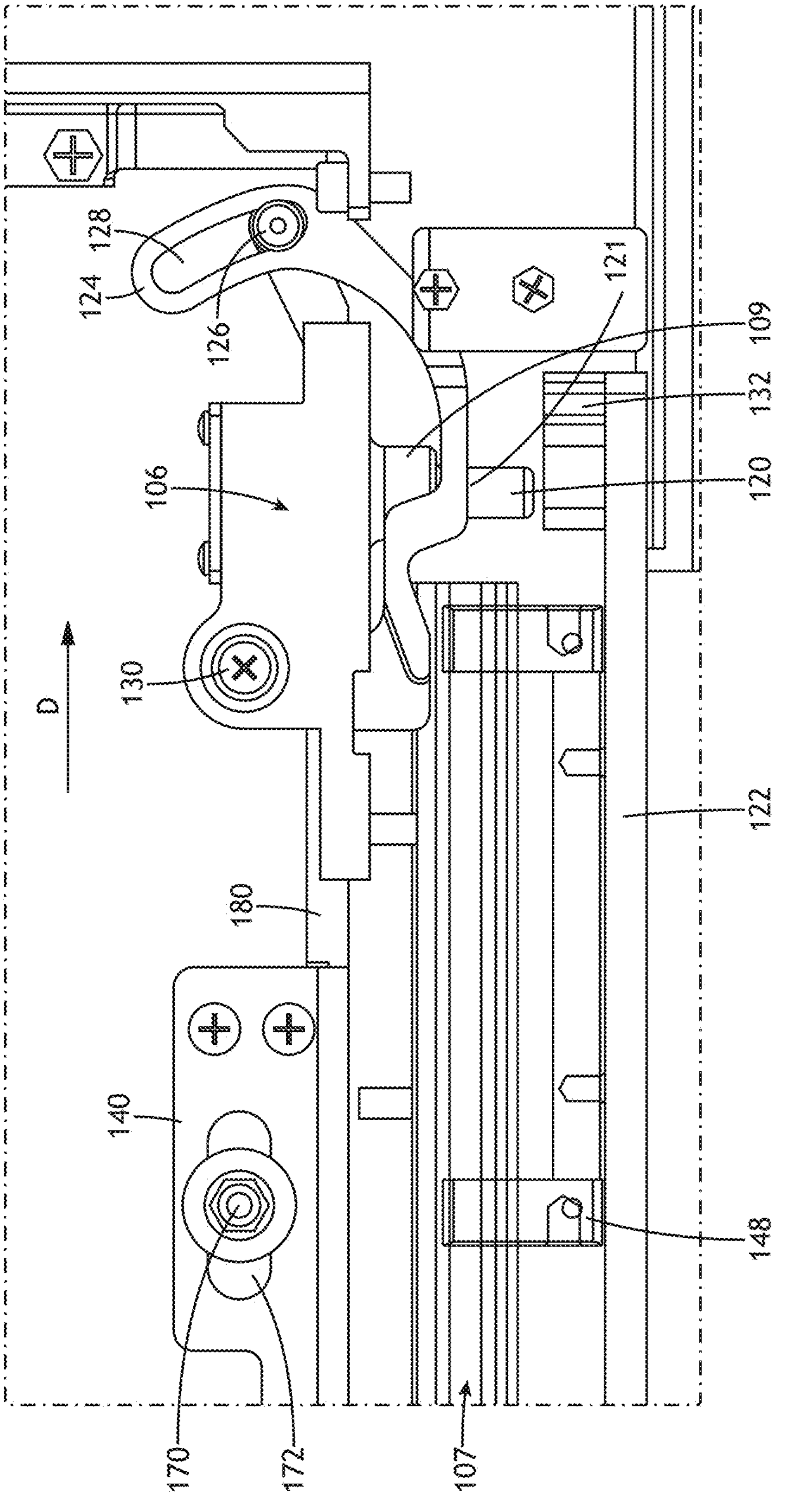
FIG. 3A is a first perspective side view of a pin housing of the overload lock in accordance with one or more embodiments of the present disclosure.
Figure 3B:
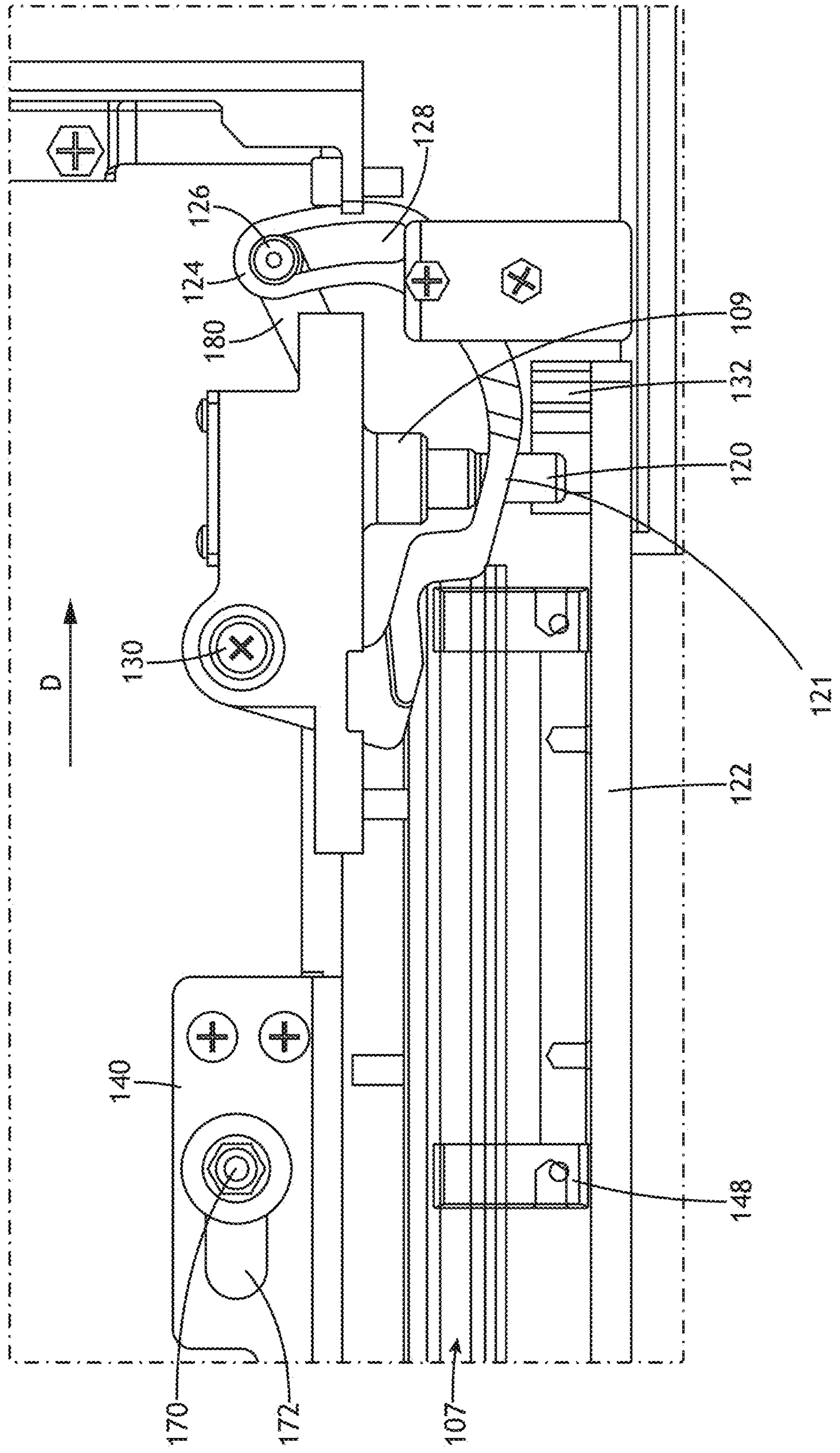
FIG. 3B is a second perspective side view of a pin housing of the overload lock in accordance with one or more embodiments of the present disclosure.
Figure 3C:
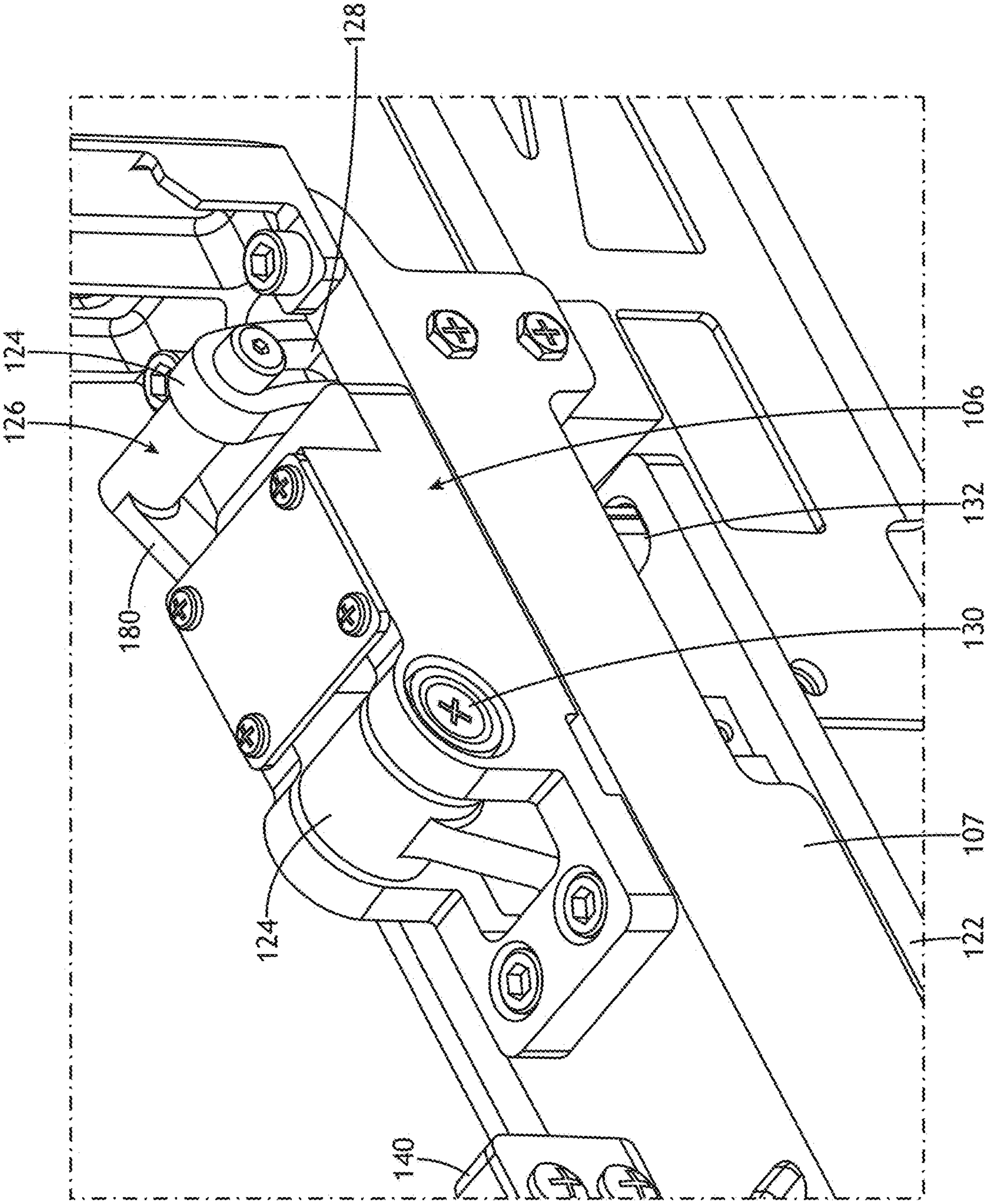
FIG. 3C is a third perspective side view of a pin housing of the overload lock in accordance with one or more embodiments of the present disclosure.

FIGS. 3A-3C depict various perspective views of the pin housing 106 and adjacent components, in accordance with one or more embodiments of the present disclosure. In embodiments, the pin housing 106 may be located on an opposite end of the actuator assembly 102 from the base spring pad 104. For example, the pin housing 106 may be secured to a terminal end of the bottom rail mount 107, as depicted in FIG. 3C. Broadly, the pin housing 106 is adapted with a spring-loaded pin 120 that, in response to an overload event, drops down to engage with a lower plate 122. This dropping of the spring-loaded pin 120 may act as a force dispersion for the overload lock 100 and/or to provide a hard stop for the lateral movement of the moving portions of the overload lock 100 in direction D.

For example, as depicted in FIGS. 3C, the pin housing 106 may be located both externally and internally to the bottom rail mount 107, with the pin housing 106 located on a top surface of the bottom rail mount 107, secured via one or more mechanical fasteners, with the spring-loaded pin 120 located within the dimensions of the bottom rail mount 107. For example, the pin housing 106 may include a pin actuator 109 that is a housing or base configured for retaining the spring-loaded pin 120, including an internal pin spring located within the spring-loaded pin 120 (not shown). The pin actuator 109 may be located at least partially within the dimensions of the bottom rail mount 107 and may be secured to the pin housing 106 via one or more mechanical fasteners. During an overload event, the spring-loaded pin 120 may extend from the pin actuator 109 through the bottom rail mount 107 and exit out of the bottom to engage with a stationary pin stop 132 located on the lower plate 122. Similar to the load spring 110, upon the overload event ending, the spring-loaded pin 120 may retract back into the pin housing 106, providing a self-resetting or self-reloading feature to the overload lock.

In embodiments, the pin housing 106 further includes a pivot arm 124, which may act as the actuation member for dropping the spring-loaded pin 120 from the pin housing 106. For example, the pivot arm 124 may be a rotatable cam linkage that includes a first end that is movably coupled at the distal end of the actuator assembly 102 via a cam follower 126 and a second end that is rotatable coupled to the pin housing 106 at a fixed position. For example, the cam follower 126 may be a linkage or arm extending perpendicularly and inward from a terminal end of the actuator linkage 140. As described in greater detail below, the movement of the actuator linkage 140, and thereby cam follower 126 in direction D, drives movement of the pivot arm 124 that results in dropping of the spring-loaded pin 120.

As further depicted in FIG. 3C, the cam following 126 may be inserted into a groove 128 located within the pivot arm 124. In this regard, the pivot arm 124 may rotate about the cam follower 126. For example, as depicted in FIGS. 3A-3C, during movement of the overload lock 100, the pivot arm 124 rotates in a downward manner. When in the normal operating position, as depicted in FIG. 3A, the cam follower 126 may rest inside the groove 128 at a first position. During movement and during rotation of the pivot arm 124, the cam follower 126 travels in direction D with the pivot arm 124 rotating about it, with movement and rotation guided by the groove 128 until the second end of the groove reaches the cam follower 126, as depicted in FIG. 3B.

In embodiments, the cam follower 126 is linked to the bracket actuator 134 by the actuator linkage 140. When the load is applied, the bracket actuator 134 shifts in the direction D relative to the bottom rail mount 107 and the components coupled to the bottom rail mount 107 (including the in housing 106. As the actuator linkage 140 and the cam follower 126 move with the bracket actuator 134. This movement by the cam follower 126 causes the pivot arm 124 to rotate down, around the pivot arm pivot point 130. This rotation allows the spring-loaded pin 120 to drop down and engage with the pin stop 132. When the load is removed, the pivot arm 124 in the opposite direction, which raises the spring-loaded pin 120, disengaging it from the pin stop 132.

In embodiments, the pivot arm 124 may be coupled to the pin housing 106 at a second position corresponding to a pivot arm pivot point 130. For example, the pivot arm pivot point 130 may be a circular, pivoting position, configured for facilitating the rotation of the pivot arm 124 at the cam follower 126. Accordingly, during actuation, the pivot arm 124 rotates at two separate positions corresponding to the cam follower 126 and the pivot arm pivot point 130. In embodiments, upon ending of the overload event, and movement of the actuator assembly 102 back to its operating position, the pivot arm 124 may rotate back to its original position, and the rotation and movement of the pivot arm 124 may occur in reverse.

In embodiments, the pivot arm 124 also includes a pin opening 121 or groove for receiving the spring-loaded pin 120, such that in normal operations and when the pivot arm 124 is positioned in normal operation position, the outer edges of the pin opening 121 are engaged with the spring-loaded pin 120, thereby retaining the spring-loaded pin 120 in the pin actuator 109. As provided herein, when the pivot arm 124 rotates during the overload event, the pivot arm 124 disengages from contact with the spring-loaded pin 120, thereby allowing the spring-loaded pin 120 to drop down. When the load is removed, the pivot arm 124 rotates in the opposite direction, which in turn, raises the spring-loaded pin 120 back into its original position in the pin actuator 109.

In embodiments, during the load event and the dropping of the spring-loaded pin 120 from the pin housing 106 occurs, the spring-loaded pin 120 may drop into and engage with a pin stop 132. For example, the pin stop 132 may be a structure or piece of material that the dropped spring-loaded pin 120 engages with when deployed. In embodiments, the pin stop 132 may act as a stopping point for the lateral movement of the moving portion of the overload lock, wherein upon engagement between the spring-loaded pin 120 and the pin stop 132, lateral movement of the moving portions of the overload lock 100 occurs. In embodiments, the pin stop 132 may additionally and/or optionally act as a force dispersion, wherein energy from the overload event causing lateral movement of the moving portions may be dispersed via the pin stop 132 to the static portions of the overload lock. In embodiments, upon the ending of the overload event, the spring-loaded pin 120 may disengage with the pin stop 132 and return to the pin housing 106. In embodiments, the pin stop 132 may be affixed or incorporated into a static component of the overload lock 100. For example, the pin stop 132 may be incorporated onto a top surface of a lower plate 122 which may be a static brace, frame, or other structure in the deployment environment and which does not move or shift during the overload event.

In embodiments, the position of the pin stop 132 may be selectively placed based on the amount of shift that is required or determined for the overload lock 100. For example, the amount of shift may be determined based on factors such as the weight of the module 101, the maximum force the overload lock 100 is rated to be used with, among other factors. By way of non-limiting example, the pin stop 132 may be positioned to provide for approximately 0.25 inches of lateral shift before engaging with the spring-loaded pin 120.

In embodiments, the overload lock 100 includes an actuator assembly 102, including a combination of static components and dynamic components. As described herein, the dynamic components of the actuator assembly 102 are configured to shift relative to the static components of the actuator assembly 102. In embodiments, and as described herein, the dynamic components of the actuator assembly 102 may shift or move in a non-uniform manner, with some dynamic components shifting relative to other dynamic components.

In embodiments, the static components of the overload lock 100 include an actuator body 142, a primary translation carriage 148, and an actuator mount 138. Additional static components of the overload lock include the lower plate 122 and the pin stop 132. In embodiments, the static components of the actuator assembly 102 and the other static components of the overload lock 100 remain motionless or in an approximately static position during the overload event in contrast to the dynamic components of the actuator assembly 102 and the other dynamic components of the overload lock 100. For example, and as described in greater detail below, the dynamic components of the actuator assembly 102 may shift in relation to the static components of the actuator assembly 102. In embodiments, the actuator body 142 and the actuator mount 138 may be configured as an attachment point for the module 101. During normal operation, the actuator body 142 and the actuator mount 138 may be used for supporting the module 101, with the module coupled to the actuator body 142. In embodiments, the primary translation carriage 148 may be selectively positioned guides that are secured to brackets, frames, other support members located at the deployment area the overload lock 100 is utilized with. In embodiment, the primary translation carriage 148 may act as a guide or facilitator for one or more of the dynamic components of the actuator assembly 102. For example, the primary translation carriage 148 may include guides that interact with the bottom rail mount 107, allowing the bottom rail mount 107 to shift or move in direction D. In embodiments, a plurality of primary translation carriages 148 may be utilized and selectively positioned to engage with the bottom rail mount 107 at a plurality of positions.

As described herein, during an overload event, shifting of the module 101 and the dynamic components of the overload lock 100 prevent overloading of the static components (e.g., the actuator body 142 and the actuator mount 138) thereby preventing or reducing the chance of breaking or failure of the static components. In embodiments, the dynamic components of the actuator assembly include a cassette assembly 160 that includes the mounted bracket 108, the bottom rail mount 107, the pin housing 106. Broadly, during the overload event, the cassette assembly 160 includes components that travel laterally in direction D and after the overload event ends, travels laterally in the reverse direction back to an original position. For example, the travel in direction D may be in response to the collapsing of the load spring 110, which provides for the shifting of the cassette assembly 160 in direction D. As described herein, this intentional shifting of the cassette assembly 160 reduces or disperses the effects of the load acting upon the overload lock 100 and by allowing the dynamic components to shift, prevents overloading of the static components, which prevents or reduces the chance of a system failure.

In embodiments, additional dynamic components of the actuator assembly include a bracket actuator 134 and an actuator linkage 140. As described in greater detail below, the bracket actuator 134 and the actuator linkage 140 dynamically coupled to the cassette assembly 160, so that the bracket actuator 134 and the actuator linkage 140 may shift relative to the cassette assembly 160 during the overload event. In this regard, the overload lock 100 may include a plurality of dynamic components that in addition to shifting relative to the static components, may also shift relative to one another. For example, shifting of the cassette assembly 160 may provide the force dispersion effect for preventing overload of the static components of the overload lock. The shifting of the bracket actuator 134 and the actuator linkage 140 may actuate the release of the spring-loaded pin 120 from the pin housing 106, resulting in the stopping of the cassette assembly.

In embodiments, the bottom rail mount 107 may be configured for receiving and/or retaining the module 101, thereby coupling the module 101 to the overload lock 100. For example, the module 101 may rest on top of the bottom rail mount 107. As part of the dynamic components, the bottom rail mount 107 may also be configured for shifting or lateral movement in response to an overload event. For example, as described above, portions of the bottom rail mount 107 may interact with the one or more primary translation carriages 148, which may facilitate the sliding or shifting of the bottom rail mount 107.

As further depicted, the actuator assembly 102 also includes one or more actuator shafts 136, which may be lengths of material that are coupled at a first position to the bracket actuator 134, extend through the length of the module 101, and are coupled at a second end to the module 101. For example, the actuator shafts 136 may be secured at each end via one or more via one or more mechanical fasteners, such as bolts, screws, or other fasteners. As further depicted, the one or more actuator shafts 136 may be inserted or located at least partially within the actuator body 142. During normal operation (i.e., in the absence of the overload event), the one or more actuator shafts 136 may move relative to the static components of the overload lock 100. For example, during normal operation, a degree of shifting or movement of the dynamic components occurs, due to standard operating conditions (e.g., minimal movement due to movement of the aircraft or vehicle the overload lock 100 is being utilized with). During this movement, the actuator shafts 136 translates the movement to the other dynamic components of the overload lock 100, resulting in shifting of the dynamic components.

As described above, the base spring pad 104 may be coupled to the bottom rail mount 107 at a position that is approximate to the bracket actuator 134. In embodiments, the spring pad linkage arm 112 may be in contact with the bracket actuator 134. During the overload event and compression of the load spring 110, the spring pad linkage arm 112 may move or shift, providing for movement of the bottom rail mount 107 in direction D. Furthermore, when the overload event is down, the load spring 110 may expand, causing the bottom rail mount 107 to move back to its original position.

In embodiments, the bracket actuator 134 included as part of the dynamic components may be a mounting fixture positioned approximate to the base spring pad 104. For example, during normal operation, the spring pad linkage arm 112 may rest against or otherwise be in contact with the bracket actuator 134. In embodiments, the bracket actuator 134 may be slidably mounted to the bottom rail mount 107.

For example, the bracket actuator 134 may be slidably coupled to the bottom rail mount 107, such that the bracket actuator 134 may shift relative to the bottom rail mount 107. For example, and as described above, the overload lock 100 may include dynamic components that shift relative to other dynamic components, in addition to shifting relative to the static components. The bracket actuator 134 and the bottom rail mount 107 are examples of dynamic components that may shift relative to each other. In embodiments, the bracket actuator 134 includes a vertically extending portion 135 with one or more attachment points for the coupling one or more actuator shafts 136 to and/or for coupling the actuator linkage 140 to.

In embodiments, the dynamic components of the overload lock further includes an actuator linkage 140. The actuator linkage 140 may, for example, be a piece of material that couples at a first end to the bracket actuator 134 and at a second end the module 101. For example, and as depicted, the actuator linkage 140 may be fixedly coupled via mechanical fasteners to the bracket actuator 134. The actuator linkage 140 may also be coupled via a shaft 170 that couples the actuator linkage 140 to the module 101. In embodiments, the shaft 170 may be positioned within an actuator groove 172, such that the actuator linkage 140 may shift or transverse laterally with respect to the module 101. For example, during an overload event, the actuator linkage 140 may shift in direction D while the shaft 170 remains static.

In embodiments, the actuator linkage 140 may further include an actuator extension member 180. The actuator extension member 180 may be attached to or formed at the terminal end of the actuator linkage 140 that is opposite from the connection between the actuator linkage 140 and the bracket actuator 134. For example, one or more mechanical fasteners may be utilized to attach the actuator extension member 180 to the actuator linkage. In embodiments and as depicted, the actuator extension member 180 may extend away from the actuator linkage 140 and may be partially located on one side of the pin housing 106. The actuator extension member 180 further extends a distance past the pin housing 106 and provides a coupling point for the cam follower 126. Accordingly, through this connection, the pin housing 106 and the bracket actuator 134 may be connected together.

Accordingly, when the overload event occurs (e.g., a load exceeding a pre-determined threshold occurs), the bracket actuator 134 shifts in the direction D relative to the cassette assembly 160 that includes the pin housing 106, pivot arm 124, and bottom rail mount 107. The actuator linkage 140 and the cam follower 126 move with the bracket actuator 134. This movement by the cam follower 126 causes the pivot arm 124 to rotate down, around the pivot arm pivot point 130. This rotation allows the spring-loaded pin 120 to drop down and engage with the pin stop 132. When the load is removed (e.g., the load decreases to an amount below the pre-determined threshold), the cam follower 126, the actuator linkage 140, and the bracket actuator 134 to their original position. This return rotates the pivot arm 124 in the opposite direction, which raises the spring-loaded pin 120, disengaging it from the pin stop 132.

Accordingly, through the connective coupling between the static and the dynamic portions of the actuator assembly 102, the base spring pad 104, and the pin housing 106, overloading of the overload lock may be prevented through lateral shifting and moving of the dynamic components relative to the static components. For example, during an overload event, the base spring pad 104 compress, allowing for shifting of dynamic components of the actuator assembly 102. As the dynamic components shift towards the pin housing 106, engagement between the actuator assembly 102 results in rotation of the pivot arm 124 dropping the spring-loaded pin 120, which in turn, engages with the pin stop 132. Once engagement between the spring-loaded pin 120 and the pin stop 132, lateral movement of the actuator assembly 102 ends, thereby stopping movement of the module 101. Upon ending of the overload event, the entire overload lock 100 resets, due to the pre-loaded springs of the base spring pad 104 and the pin housing 106. Accordingly, during an overload event, human intervention is not required during the process nor to reset the system.

Figure 4:
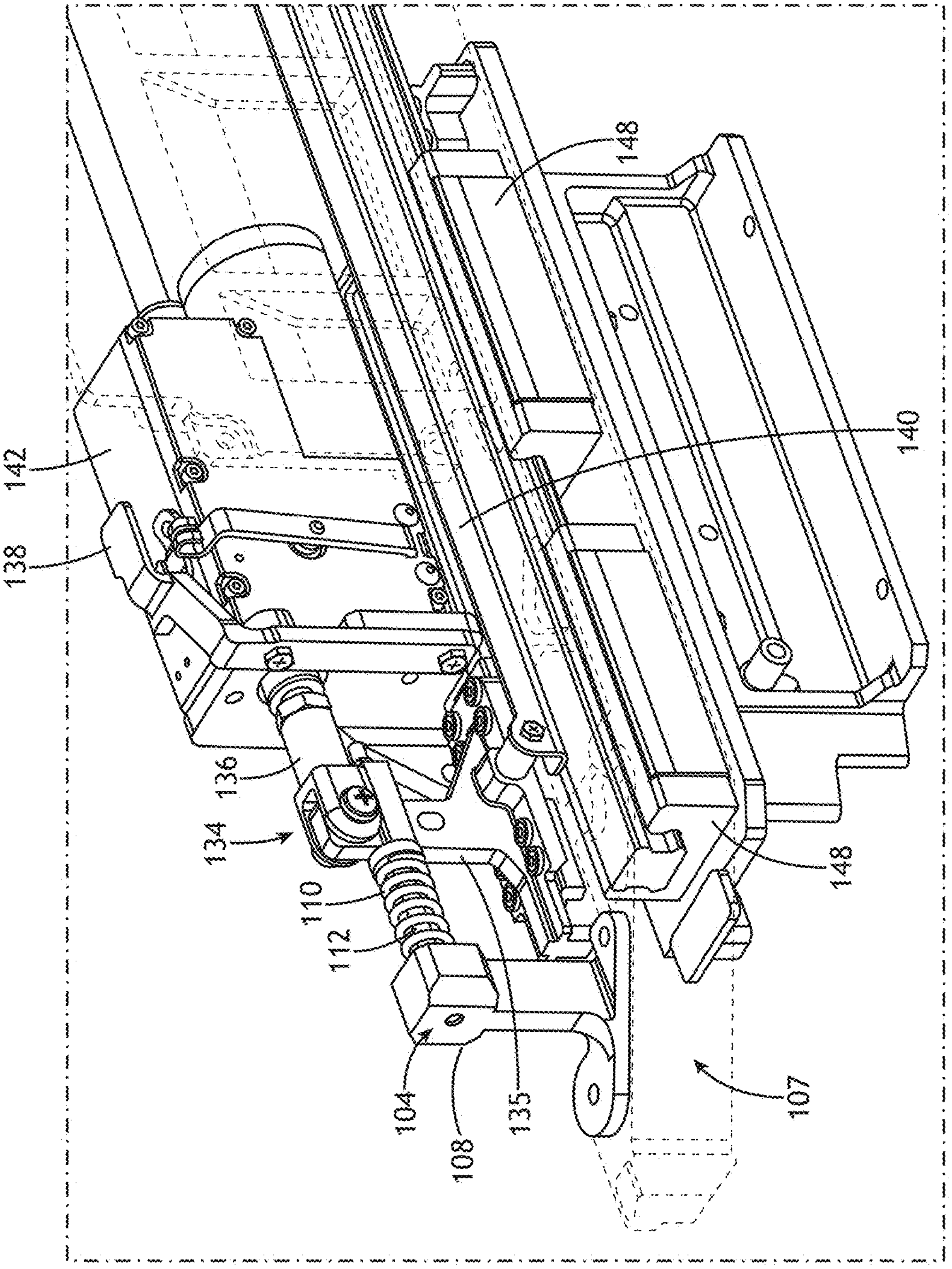
FIG. 4 is a first perspective view of an alternate embodiment of the base spring pad of the overload lock in accordance with one or more embodiments of the present disclosure.

FIG. 4 depicts a side perspective view of an alternative embodiment of the overload lock 100 with an alternative design of the base spring pad 104. As provided above, the base spring pad 104 may include different movement mechanism in addition to or in place of a rotating spring pad linkage arm 112. For example, and as depicted in FIG. 4, the base spring pad 104 may include a spring pad linkage arm 112 that is coupled at a first end to the mounted bracket 108 and a second end that is coupled to the bracket actuator 134. Additionally, the load spring 110 may be located at least partially around the spring pad linkage arm 112. During the overload event, rather than rotate, the spring pad linage arm 112 may transversely move when the load spring 110, resulting in the shifting of the components as described above, with the mounted bracket 108 being affixed to the bottom rail mount 107 and the bracket actuator 134 coupled to the actuator linkage 140. As also depicted, the actuator mount 138 and the actuator body 142 may be located at different locations along the actuator shaft 136 for supporting and/or coupling to the module 101.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The described subject matter sometimes illustrates different components contained within, or connected with, other components. It is to be understood that such depicted architectures are merely illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

The described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A collapsible aircraft module locking system, the system comprising:

an actuator assembly including dynamic components and static components;

a base spring pad approximate to a first end of the actuator assembly, the base spring pad comprising a load spring;

a pin housing located approximate to a second end of the actuator assembly, the pin housing comprising a spring-loaded pin and a pivot arm coupled at a first position to the pin housing and coupled at a second position to the actuator assembly, wherein responsive to a force applied to the system, the load spring of the base spring pad compresses causing lateral movement of the dynamic components of the actuator assembly toward a direction of the pin housing, wherein lateral movement of the dynamic components of the actuator assembly causes the pivot arm to rotate, dropping the spring-loaded pin towards a stationary pin stop, wherein engagement between the spring-loaded pin and the stationary pin stop causes lateral movement of the dynamic components of the actuator assembly to stop moving.

2. The system of claim 1, wherein the dynamic components of the actuator assembly include an actuator linkage and a bottom rail mount, when the actuator linkage shifts relative to the bottom rail mount and the static components of the actuator assembly.

3. The system of claim 2, when the base spring pad is located at a first end of the bottom rail mount and the pin housing is located at a second end of the bottom rail mount.

4. The system of claim 3, further comprising:

a bracket actuator slidably coupled to the bottom rail mount, wherein a first end of the actuator linkage is fixedly coupled to the bracket actuator.

5. The system of claim 4, wherein the base spring pad further comprises a spring pad linkage arm that engages with the bracket actuator.

6. The system of claim 5, wherein compression of the load spring causes lateral shifting of the bottom rail mount and the bracket actuator.

7. The system of claim 4, wherein the actuator linkage is coupled to the pivot arm, wherein lateral movement of the actuator linkage causes rotational movement of the pivot arm.

8. The system of claim 4, wherein the pin housing is located at a second end of the bottom rail mount.

9. The system of claim 1, wherein the pivot arm includes a groove adapted for receiving a portion of the dynamic components of the actuator assembly, wherein movement of the dynamic components of the actuator assembly causes rotational movement of the pivot arm.

10. The system of claim 9, wherein the pivot arm includes an actuator groove wherein edges of the actuator groove engage with the spring-loaded pin to retain the spring-loaded pin in the pin housing, wherein upon rotation of the pivot arm, the actuator groove disengages with the spring-loaded pin causing the spring-loaded pin to drop from the pin housing.

11. The system of claim 1, wherein the load spring is pre-loaded to sustain an applied upon force up to a pre-determined amount, wherein a force that is less than the pre-determined amount does not cause compression of the load spring.

12. The system of claim 11, wherein the load spring is configured to self-reset responsive to the applied upon force decreasing to below the pre-determined amount.

13. The system of claim 12, wherein responsive to the load spring self-resetting, the dynamic components of the actuator assembly laterally move in an opposite direction to self-reset.

14. The system of claim 13, wherein responsive to the load spring self-resetting, the pivot arm rotates back to an original position and retracts the spring-loaded pin into the pin housing.

15. The system of claim 1, wherein the stationary pin stop is selectively positioned to stop lateral movement of the dynamic components of the actuator assembly at a pre-determined distance.

16. The system of claim 2, wherein the static components of the actuator assembly includes one or more translation carriages configured for facilitating lateral movement of the bottom rail mount.

17. The system of claim 1, wherein an aircraft module is at least partially supported by the actuator assembly.

* * * * *